US005576690A

United States Patent [19]

Waugh et al.

[11] Patent Number: 5,576,690

[45] Date of Patent: Nov. 19, 1996

[54] COMBINED AUDIBLE AND VISUAL SIGNALING DEVICE

[75] Inventors: David Waugh, Tuckahoe; Leslie M. Orloff, Cold Spring Harbor, both of N.Y.

[73] Assignee: Fred M. Schildwachter & Sons, Inc., Bronx, N.Y.

[21] Appl. No.: 511,914

[22] Filed: Aug. 7, 1995

Related U.S. Application Data

[63] Continuation of Ser. No. 242,305, May 13, 1994.

[51] Int. Cl.$^{6}$ .......... G09B 1/08

[52] U.S. Cl. .......... 340/539; 340/521; 340/692; 340/531; 340/825.19

[58] Field of Search .......... 340/691, 692, 340/545, 539, 573, 531, 326, 628, 825.19, 521; 379/376

[56] References Cited

U.S. PATENT DOCUMENTS

| | | | |
|---|---|---|---|
| D. 360,156 | 7/1995 | Fenne | D10/106 |
| 3,054,944 | 9/1962 | Brooke | 323/337 |
| 3,054,994 | 9/1962 | Haram | 340/326 |
| 4,227,191 | 10/1980 | Raber | 340/628 |
| 4,365,238 | 12/1982 | Kollin | 340/521 |
| 4,379,210 | 4/1983 | Sparber | 179/84 |
| 4,777,474 | 10/1988 | Clayton | 340/539 |
| 5,140,304 | 8/1992 | Miller | 340/472 |

*Primary Examiner*—Jeffery Hofsass
*Assistant Examiner*—Albert K. Wong
*Attorney, Agent, or Firm*—Brooks Haidt Haffner & Delahunty

[57] ABSTRACT

Push button controlled wireless transmitters send digitally encoded signals to a plug-in receiver/signaling device. The receiver/signaling device has a microprocessor suitably programmed to respond to signals from a transmitter bearing the discrete address of the receiver, and to decode a transmitter identification code. Thereupon the microprocessor supplies an audio output circuit with signals to simulate selectively mechanical front or back door chimes, and supplies signals to energize a strobe lamp to emit bursts of multiple flashes, the number of flashes in a burst identifying the specific transmitter, whereby a person with a hearing deficiency is informed as to which transmitter is being actuated.

24 Claims, 4 Drawing Sheets

COMBINED AUDIBLE AND VISUAL SIGNALING DEVICE

This application is a continuation of application Ser. No. 08/242,305, filed May 13, 1994.

FIELD OF THE INVENTION

The present invention relates to a combined audible and visual signaling device for simultaneously generating distinctive acoustic and visual messages in response to different events, communicating with both hearing-impaired and normal hearing individuals.

BACKGROUND OF THE INVENTION

Many systems rely upon an audible signal to communicate with people. Examples are smoke/fire alarms and home security devices, telephones, doorbells, and the like. For deaf or hard of hearing persons, however, the aural realm of the senses is impaired and alternative senses must be engaged in order to adequately receive the warning or message. Further, even those having normal hearing may be distracted or otherwise occupied, or have their hearing impaired by, for example, the wearing of headphones, and miss the normal audible signal.

Ways to signal deaf or hearing-impaired persons include augmenting an audible signal, see, for example, U.S. Pat. No. 4,777,474, or providing a corresponding visually perceptible signal in lieu of the audible message. However, systems that provide both audible and visually perceptible messages are preferred, particularly since households and workplaces frequently have normal hearing persons present also. Nonetheless, conventional devices are unable to generate both distinctive sounds and distinctive visually perceptible signals to alert individuals of more than one potential event. Indeed, current devices are unable to distinguish visually the multitude of audible alert signals present in a given situation, and are frequently limited to the simple action of turning on a particular light source to alert an individual of an audible event such as a phone call. See, for example, U.S. Pat. No. 3,054,994, describing a signaling system automatically turning on a reading lamp in response to an audible signal.

Thus, despite the various advances in combining a visually perceptible message with an audible one, conventional devices are inadequate to allow deaf or hearing-impaired individuals to distinguish between various acoustic events within the home or workplace. These advances, however, come to full fruition in the device of the present invention, which provides individuals with visual signals enabling discrimination between various events.

SUMMARY OF THE INVENTION

It is an object of the present invention to provide an improved alerting system which simultaneously generates an audible and a visual signal.

A further object of the invention is to provide an alerting system which generates a unique visual signal for each of different events, thereby alerting a hearing-impaired individual of a particular event.

In accordance with the present invention, there is provided in combination an audible signal generator, a visual signal generator, and apparatus coupled to both of the generators and responsive to an input signal for energizing the generators, the apparatus having at least two modes of operation such that for each mode of operation of the apparatus each of the generators produces a respective signal that is distinctly different from that produced in response to another of the modes of operation.

While the present invention has a generic application, it will be described with reference to a specific embodiment intended to take the place of a conventional door chime of the type that provides distinctive signals indicative of the operation of a doorbell button switch at either a front or back door of a dwelling or the like.

BRIEF DESCRIPTION OF THE DRAWINGS

The invention will be better understood after reading the following detailed description of the presently preferred embodiment thereof with reference to the appended drawings in which.

The same reference numerals are used throughout the drawings to designate the same or similar parts.

DETAILED DESCRIPTION OF THE PREFERRED EMBODIMENT

The object of the present device is to provide apparatus for generating a distinctive visual signal in conjunction with a corresponding distinctive audible signal in response to actuation of one of a plurality of signaling buttons, such as a doorbell switch. The preferred embodiment employs a wireless communicating system in which transmitters are located at the doorbell buttons, while a radio receiver circuit is located in association with a chime generator and strobe light.

Figure 1:
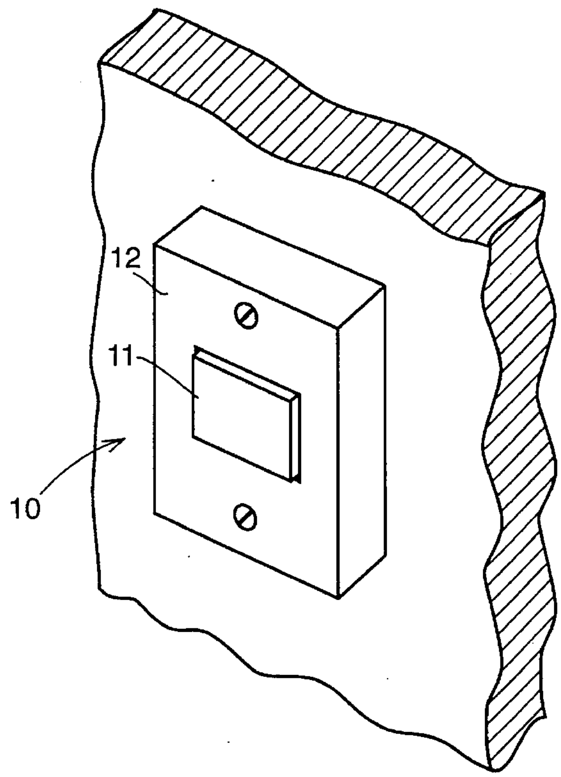
FIG. 1 is a suggestive illustration of a push button switch for operating the signaling device of the present invention.

Reference should now be had to the drawings and, particularly, to FIG. 1. As shown therein, designated generally by the reference numeral 10, is a battery operated push button controlled wireless transmitter, the push button being designated 11 within a housing 12. The transmitting device 10 may be constructed in any known manner, for example, similar to a wireless remote garage door opener. In the present embodiment, the transmitter is arranged to transmit a carrier signal operating at 315 mhz., which is pulse width modulated to carry a digital signal of 12 bits where 6 bits are used for the address, three bits carry data, and the remaining bits are fixed. The address bits are intended in known manner to insure that the signals are received only by the intended receiver while the data bits are designed to provide identification of one of a plurality of push button transmitters, such that ready recognition can be provided as to back door or front door, or the like.

Figure 2:
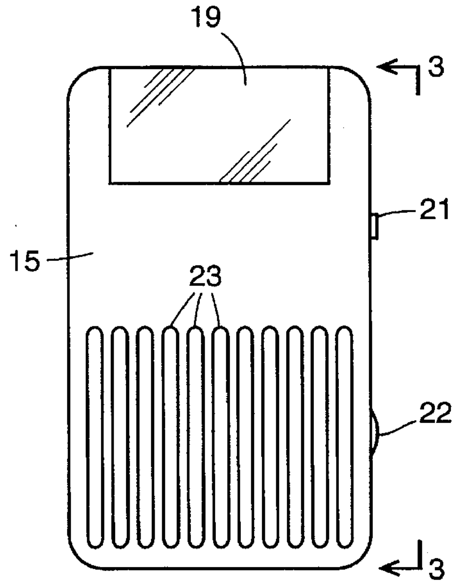
FIG. 2 is a front elevational view of the housing or case for the signaling device embodying the present invention.
Figure 3:
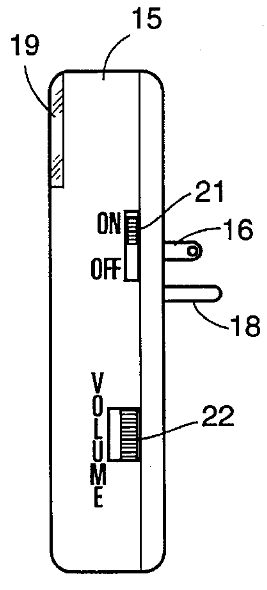
FIG. 3 is a side elevational view of the housing of FIG. 2 as seen in the direction of the arrows 3—3.
Figure 4:
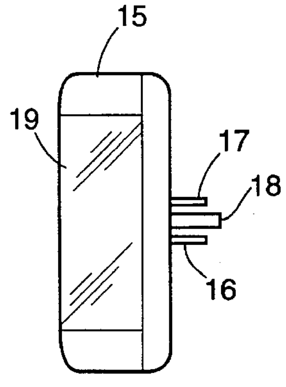
FIG. 4 is a top plan view of the housing as seen in FIG. 3.

In FIGS. 2, 3 and 4, there is illustrated the housing containing the receiving equipment and the generators for producing the audible and visual signals. As seen in FIGS.

2, 3 and 4, the apparatus of the present invention is enclosed within a housing 15 provided with electrically conductive blade and pin elements 16, 17 and 18 of a three-prong plug projecting from the rear-wall of the housing 15 arranged to be plugged directly into any conventional electric wall outlet (not shown). A window or transparent insert 19 encloses a space containing a strobe lamp designated generally by the numeral 20 in FIG. 5. As best seen in FIG. 3, the apparatus is provided with an on/off switch 21 and a volume control 22. While in FIG. 2, it can be seen that the front of the housing is provided with a plurality of parallel slots 23 to permit emission of the audible signals produced by a speaker, the details of which will be described below.

Each of the push button switches 10 comprises an individual wireless transmitter activated upon actuation of the respective push button switch 11 to transmit an address-bearing carrier signal upon which is imposed a modulation signal carrying the identification of the actuated push button switch.

Figure 5:
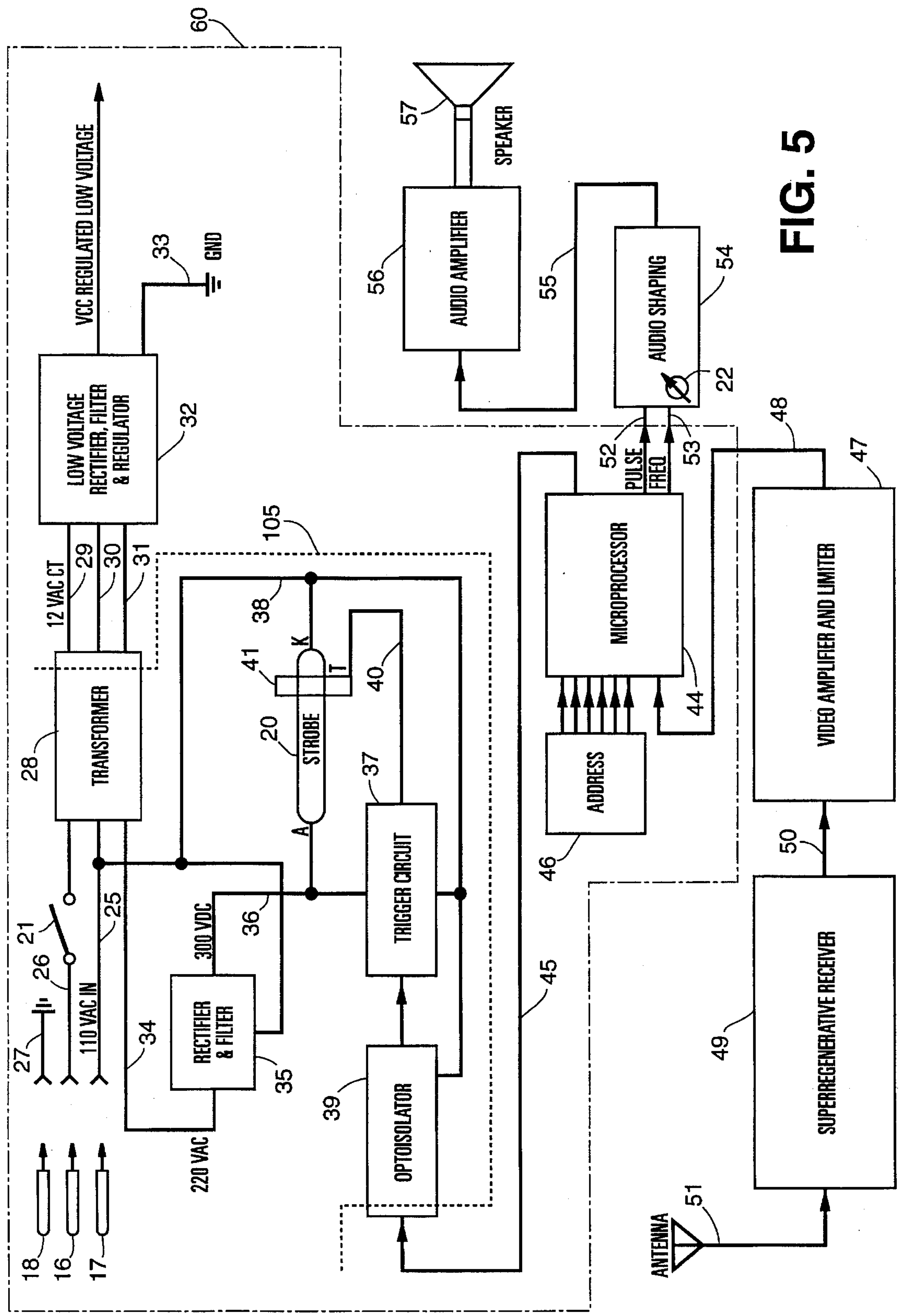
FIG. 5 is a block diagram of the electronic circuit incorporated within the housing shown in FIGS. 2, 3 and 4.

Referring now to FIG. 5, there is shown in block diagram the components incorporated within the housing described with reference to FIGS. 2, 3 and 4.

Referring now to FIG. 5, the blade 17 of the three-prong plug assembly is connected to the lead 25 while the blade 16 is connected to the lead 26 and the pin or prong 18 is connected to ground at 27. Lead 26 is connected through the switch 21 to a transformer 28 through which is also connected the lead 25. Transformer 28 is connected by leads 29, 30 and 31 to a low voltage rectifier, filter and regulator circuit 32 which provides a regulated low voltage designated VCC. The circuit 32 is also connected to ground by a lead 33. With a 110 V. AC input, the transformer 28 provides 220 V. over a lead 34 to a rectifier and filter circuit 35 which provides 300 V. DC over a lead 36 to both the anode (A terminal) of the strobe lamp 20 and to a trigger circuit 37. The power input lead 25 is connected by a tap circuit 38 to the rectifier and filter circuit 35, the cathode (K terminal) of the strobe light 20, a trigger circuit 37 and an optoisolator 39.

The trigger circuit 37 provides an output over lead 40 to feed trigger signals to the trigger terminal 41 of the strobe light 20.

Signals for controlling the triggering of the strobe light 20 are obtained from a microprocessor 44 over a lead 45. An address setting circuit 46 is shown connected to inputs to the microprocessor 44. Also, the output from a video amplifier and limiter 47 is connected to the microprocessor over a lead 48. The video amplifier and limiter 47 is fed from a super-regenerative receiver of conventional construction 49 over a lead 50, the receiver 49 receiving its input from a suitable antenna 51.

In addition to the output to the optoisolater 39 provided by the microprocessor 44, two signals are provided by the microprocessor over output leads 52 and 53 to an audio shaping circuit 54 which feeds over lead 55 an audio amplifier 56 feeding, in turn, a speaker 57. As indicated symbolically in FIG. 5, the volume control 22 is located in the audio shaping circuit 54.

It is believed that the radio receiver circuitry consisting of the receiver 49 and video amplifier and limiter 47 as well as the audio shaping and audio amplifier circuits 54 and 56 are of conventional construction and, therefore, the details thereof will not be discussed in any greater detail. However, all of the components shown within the dot dash box 60 in FIG. 5 are shown in detail in FIG. 6 to which attention should now be directed.

Figure 6:
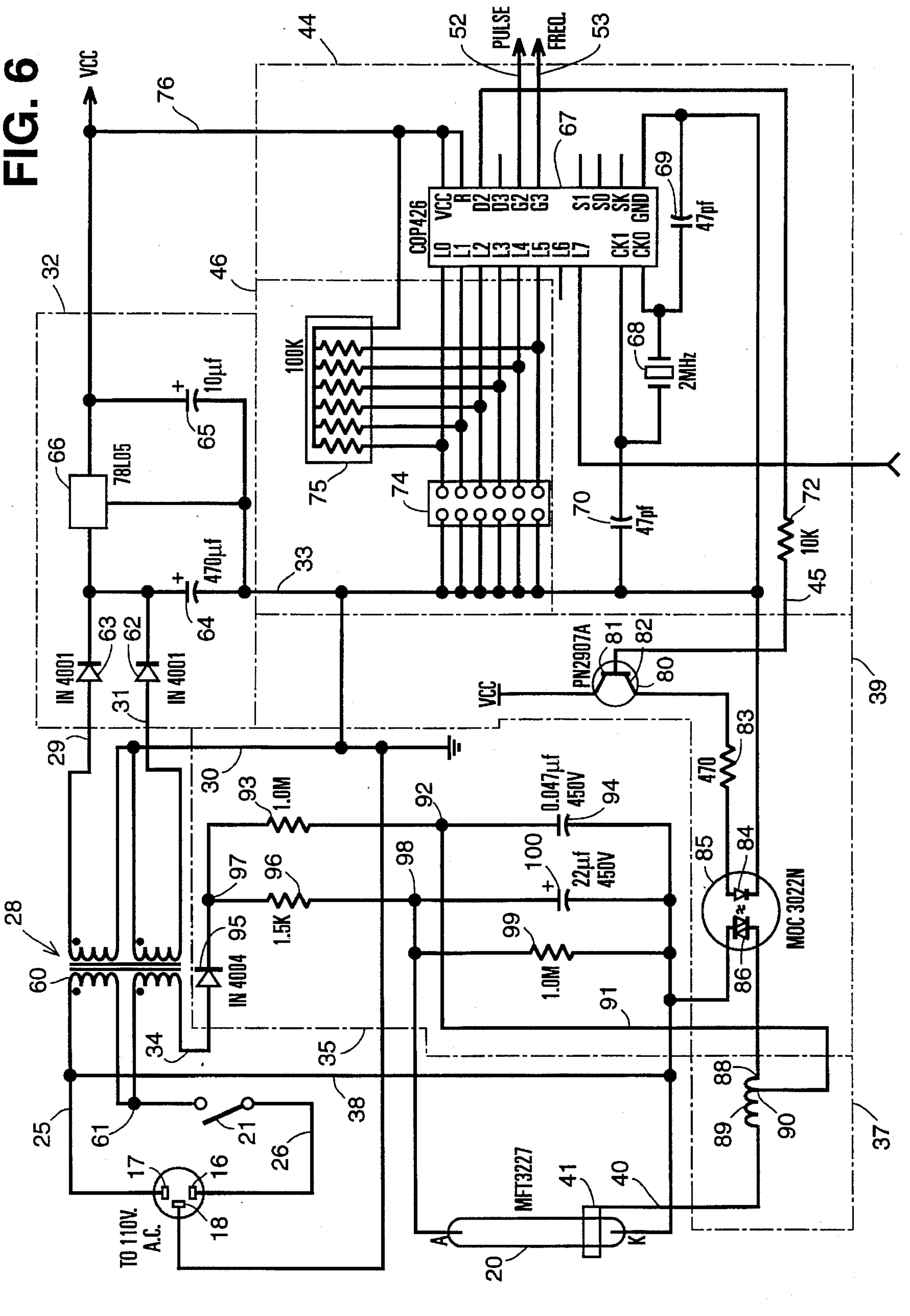
FIG. 6 is a schematic circuit diagram of the portion of the circuit shown within the dash dot lines in FIG. 5.

Referring specifically to FIG. 6, the transformer 28 has both a dual primary and dual secondary winding which windings are respectively connected in series so as to provide a center tapped transformer primary and a center tapped secondary. As clearly shown, the 110 V. input is applied between the terminal 60 and the center cap junction 61. This provides a 220 V. output on lead 34 connected to the lower end of the second half of the primary winding. On the secondary side, the two windings of the transformer 28 are connected into a full-wave rectifier circuit consisting of the diodes 62 and 63, capacitors 64 and 65 and a type 78L05 voltage regulating component 66 to provide a regulated 5 V.DC for powering the low voltage portion of the circuit.

As shown in FIG. 6, the microprocessor 44 consists of a type COP426 processor chip 67 supplied with clock signals from a 2 Mhz crystal 68 coupled between the two clock input terminals of the chip 67. Capacitors 69 and 70 are connected between ground and the opposite terminals of the crystal 68. The G2 and G3 output terminals of the microprocessor supply the pulse and frequency signals on leads 52 and 53, respectively, to the audio shaping circuit 54. The D2 output terminal supplies the strobe triggering signal to the optoisolator circuit 39 through a resistor 72.

The address circuit 46 consists of a series of connector pairs in an array 74 of which one connector of each pair is connected to ground while each of the other connectors are connected respectively to the input terminals L0 to L5 of the processor 67. A series of resistors are connected between the VCC voltage bus 76 and each of the terminals L0 to L5. Pre-setting of the address of the processor 67 is accomplished by inserting suitable jumpers between selected ones of the pairs of connectors. As presently shown in the drawing with no jumpers present, logical highs will be applied to all of the terminals L0 to L5. Inserting a jumper will apply a logical low to the associated processor terminal.

The microprocessor 67 is programmed to supply on lead 53 a square wave signal of the desired frequency, while the lead 52 is supplied with a pulse marking the start time of the audible signal.

The optoisolator includes an input transistor 80 having a base electrode 81 coupled to the lead 45 and having a collector electrode 82 connected through a resistor 83 to an LED component 84, within a type MOC 3022N device 85, the other side of the LED 84 being connected to ground. The emitter 79 of transistor 80 is connected to the VCC supply. Associated with the LED 84 within the device 85 is a photosensitive triac semiconductor component 86 which is connected between the lead 38 and one end 88 of a high potential induction coil 89, the latter forming part of the trigger circuit 37. A low voltage tap 90 on the coil 89 is connected over lead 91 to the junction 92 between a resistor 93 and a capacitor 94. The opposite end of the capacitor 94 is connected to the lead 38 while the opposite end of resistor 93 is connected to the cathode of a diode 95 whose anode is connected to the lead 34. The diode 95 is a type 1N4004 device.

Another resistor, 96, has one end connected to the cathode of diode 95 through a junction 97, and its other end connected to a junction 98 to which is also connected the anode (A) of the strobe lamp 20, one terminal of a resistor 99, and one terminal of a capacitor 100. The opposite terminals of resistor 99 and capacitor 100 are connected to the lead 38.

To prepare the circuit of FIG. 6 to operate, the microprocessor 67 is programmed to respond to a 12-bit digital input signal. The program causes the processor to continually scan the incoming data levels looking for a signal of the type expected. When such a signal is found, the processor decodes the data bits as they come in, holding the data until the signal is complete. The data received is then compared with the data required for a response to occur. First, the received address bits are compared with the address supplied from the address input device 46. If the received address matches the pre-set address, and if the three fixed bits are correct, the processor then looks at the three data bits to determine the proper response. In the present embodiment only two data bits are considered, one bit to indicate a front door, and a second bit to indicate a back door.

When a signal with a correct address contains at least one of the expected data bits, the microprocessor 44 switches to produce the signals necessary to create the desired visual and audio output. A square wave having the desired pulse repetition rate is supplied to lead 53 while a start pulse is supplied to lead 52. The signals on leads 52 and 53 go to the audio shaping and amplifier circuits 54 and 56 which create the actual output waveforms. Each chime sound in the present embodiment is produced by a square wave starting at a high amplitude that slowly decays exponentially in amplitude. The decaying waveform simulates the waveform created in a mechanical chime. The output of the shaping circuit 54 is fed to the audio amplifier 56 where it is boosted in power to a suitable level. The amplifier 56 drives the speaker 57.

In response to a correct input signal, the microprocessor 44 also produces a series of pulses that are fed to the optoisolator 39 to trigger the strobe lamp 20. The pulses from the microprocessor 44 apply a low signal to the base electrode 81 causing transistor 80 to become conductive thereby energizing LED 84. This causes the semiconductor device 86 to become conductive completing a circuit for discharging capacitor 94 via junction 92, lead 91, tap 90, terminal 88, and device 86, through the low voltage primary portion of coil 89. This produces across the full coil 89 a high voltage pulse exceeding about 4000 volts which is sufficient to trigger the strobe lamp 20. The lamp 20, when rendered conductive, discharges the capacitor 100 which has been charged through diode 95 and resistor 96, whereupon the strobe lamp 20 is extinguished.

Figure 7:
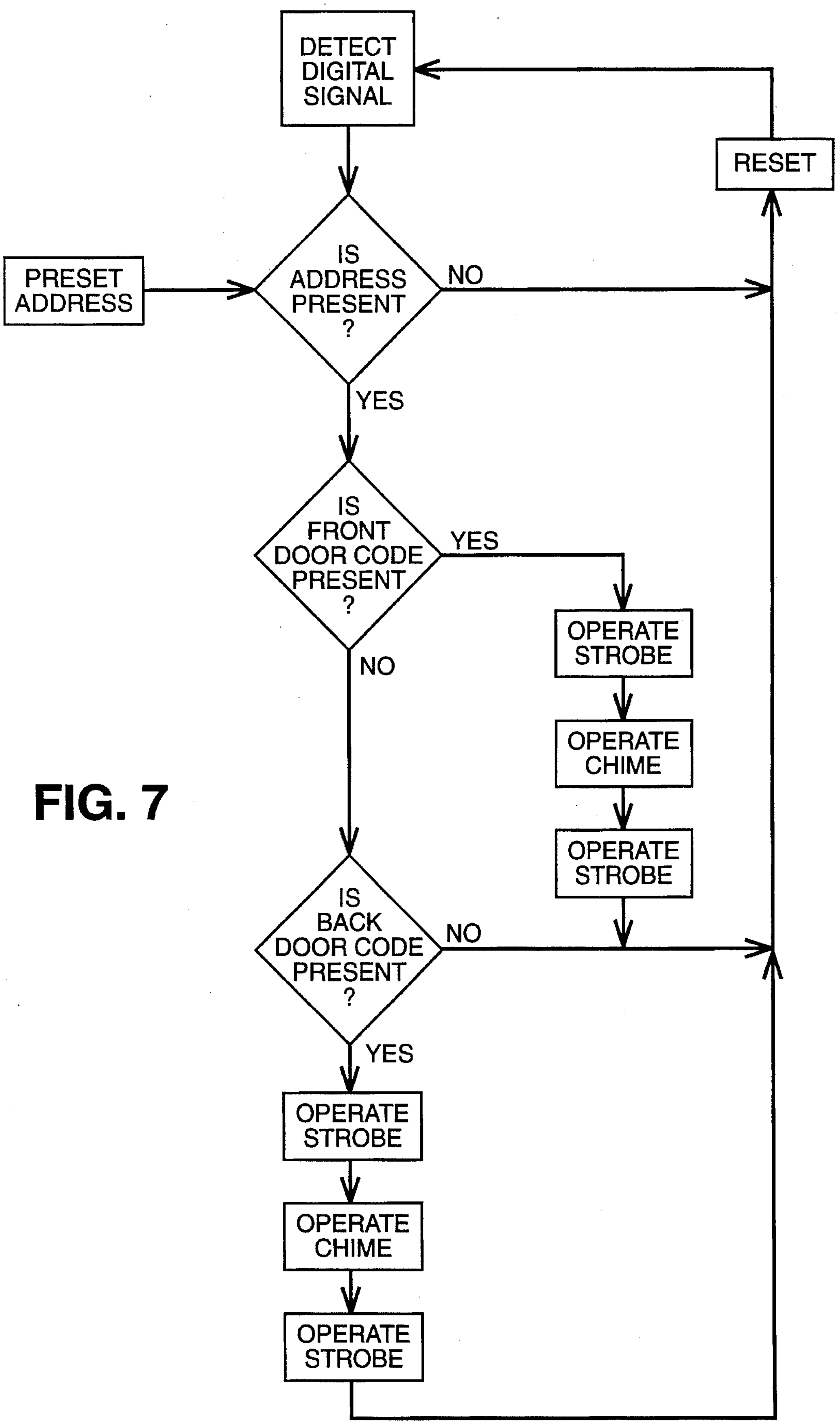
FIG. 7 is a flow chart showing the overall operation of the circuit illustrated in FIGS. 5 and 6.

The presently preferred mode of operation is shown in the flow chart in FIG. 7. Upon detecting a possibly valid signal the processor checks for the pre-set address. If not present the system resets awaiting the next signal. But if the address is correct, the system next checks for presence of the front door code. If that is present the system proceeds to operate in alternating sequence, first energizing the strobe followed by the chime and then a repetition of the strobe.

If the front door code is not present, the system checks for the back door code. In its absence the system resets for the next incoming signal. But if the code is present the system proceeds in similar fashion to its operation for the front door response, to operate the strobe and chime in alternating sequence, the only difference being that the chime is distinctively different for the front and back doors, and the strobe operation is likewise different as between front and back doors.

At present the preferred mode of operation is to produce a burst of five flashes from the strobe lamp 20 for the front door and a burst of three flashes for the back door. Two bursts, spaced apart in time by the time for the audible signal, are also preferred at present. The first burst may not catch the attention of the hard of hearing in time for recognition to take place. However, if it serves to attract the attention of the individual, the second burst will provide the necessary recognition as to which doorbell button is being used.

A feature of the present circuitry is the complete isolation of the high voltage section from the low voltage section. The only link is through the transformer 28 and the optoisolator 39. In addition, an electromagnetic and electrostatic shield 105 (see FIG. 5) separates the two sections of the system.

Having described the presently preferred embodiment of the present invention, it should be apparent that various changes in construction and embodiment can be made without departing from the true spirit of the present invention as defined in the appended claims. For example, the invention can readily be adapted to providing smoke and fire alarms. If, for example, the invention were to be applied to a telephone as well as door chimes, the separate receivers can be programmed to provide distinctive visual signals in addition to the audible signals.

What is claimed is:

1. A combined audible and visual signaling device for handicapped people comprising in combination an audible signal generator, a high intensity light emitting generator including a strobe light capable of producing a burst of plural flashes, apparatus having means for receiving a plurality of separately distinguishable input signals, said apparatus having outputs coupled to both of said signal generators and responsive to any one of said plurality of input signals for energizing both of said signal generators, said apparatus having a plurality of modes of operation with each mode corresponding to a different one of said plurality of separately distinguishable input signals such that for each mode of operation of said apparatus each of said generators produces a respective energized signal that is distinctly different from that produced by such generator in response to another of said modes of operation, and separate switch controlled means for producing respectively each of said separately distinguishable input signals, said switch controlled means being locatable at separate entryways to an occupiable structural enclosure, with both of said signal generators being locatable within said enclosure.

2. A combined audible and visual signaling device comprising in combination an audible signal generator, a high intensity light emitting generator including a strobe light capable of producing a burst of plural flashes, apparatus having means for receiving a plurality of separately distinguishable input signals, said apparatus having outputs coupled to both of said signal generators and responsive to any one of said plurality of input signals for energizing both of said signal generators, said apparatus having a plurality of modes of operation with each mode corresponding to a different one of said plurality of separately distinguishable input signals such that for each mode of operation of said apparatus each of said generators produces a respective energized signal that is distinctly different from that produced by such generator in response to another of said modes of operation, said apparatus and said audible signal generator being constructed for producing signals associated with a door chime, and separate push button switches provided for each of a plurality of doors with each of said push button switches coupled to said apparatus for causing said apparatus to operate in a different one of said modes for each of said push button switches.

3. A combined audible and visual signaling device according to claim 2, wherein said push button switches comprise individual wireless transmitters activated upon actuation of the respective push button switch to transmit an address bearing carrier signal upon which is imposed a modulation signal carrying identification of the actuated push button switch, and said apparatus includes a wireless receiver responsive to said wireless transmitter for enabling said apparatus to energize said generators to provide said audible and light emitting signals when said transmitted carrier signal contains the address of said wireless receiver.

4. A combined audible and visual signaling device according to claim 3, wherein said apparatus and said generators are disposed in a common housing and provided with the blade and pin elements of a three prong plug projecting from a rear wall of said housing arranged to be plugged directly into an electric wall outlet, and means within said housing for coupling said plug elements to said apparatus and said generators for supplying operating power thereto.

5. A combined audible and visual signaling device according to claim 4, wherein said apparatus is constructed to energize said strobe light to flash at a different visually detectable rate for each of said modes of operation.

6. A combined audible and visual signaling device according to claim 5, wherein said apparatus is constructed to energize said strobe light to emit a plurality of flashes in at least two separate bursts where the bursts are spaced by a time interval in excess of the time between flashes within a burst.

7. A combined audible and visual signaling device according to claim 6, wherein said apparatus comprises a microprocessor programmed to energize said generators sequentially for each of said modes of operation with said audible signal generator being energized during the interval between bursts of flashes from said light emitting generator.

8. A combined audible and visual signaling device according to claim 2, wherein said apparatus is constructed to energize said light emitting signal generator to produce a series of light emissions having a different visually detectable character for each of said modes of operation.

9. A combined audible and visual signaling device according to claim 8, wherein said apparatus comprises a microprocessor programmed to energize said generators sequentially for each of said modes of operation with said audible signal generator being energized between two successive occurrences of said series of light emissions from said light emitting signal generator.

10. A combined audible and visual signaling device according to claim 9, wherein said apparatus and said generators are disposed in a common housing and provided with the blade and pin elements of a three prong plug projecting from a rear wall of said housing arranged to be plugged directly into an electric wall outlet, and means within said housing for coupling said plug elements to said apparatus and said generators for supplying operating power thereto.

11. A combined audible and visual signaling device according to claim 8, wherein said apparatus and said generators are disposed in a common housing and provided with the blade and pin elements of a three prong plug projecting from a rear wall of said housing arranged to be plugged directly into an electric wall outlet, and means within said housing for coupling said plug elements to said apparatus and said generators for supplying operating power thereto.

12. A combined audible and visual signaling device according to claim 4, wherein said apparatus is constructed to energize said visual signal generator to produce a series of light emissions having a different visually detectable character for each of said modes of operation.

13. A combined audible and visual signaling device according to claim 12, wherein said apparatus comprises a microprocessor programmed to energize said generators sequentially for each of said modes of operation with said audible signal generator being energized between two successive occurrences of said series of light emissions from said light emitting signal generator.

14. A combined audible and visual signaling device comprising in combination an audible signal generator, a high intensity light emitting generator including a strobe light capable of producing a burst of plural flashes, apparatus having means for receiving a plurality of separately distinguishable input signals, said apparatus having outputs coupled to both of said signal generators and responsive to any one of said plurality of input signals for energizing both of said signal generators, said apparatus having a plurality of modes of operation with each mode corresponding to a different one of said plurality of separately distinguishable input signals such that for each mode of operation of said apparatus each of said generators produces a respective energized signal that is distinctly different from that produced by such generator in response to another of said modes of operation, said apparatus and said generators being disposed in a common housing and provided with the blade and pin elements of a three prong plug projecting from a rear wall of said housing arranged to be plugged directly into an electric wall outlet, and means within said housing for coupling said plug elements to said apparatus and said generators for supplying operating power thereto.

15. A combined audible and visual signaling device according to claim 14, wherein said apparatus is constructed to energize said light emitting signal generator to produce a series of light emissions having a different visually detectable character for each of said modes of operation.

16. A combined audible and visual signaling device according to claim 15, wherein said apparatus comprises a microprocessor programmed to energize said generators sequentially for each of said modes of operation with said audible signal generator being energized between two successive occurrences of said series of light emissions from said light emitting signal generator.

17. A combined audible and visual signaling device according to claim 1, wherein said apparatus is constructed to energize said light emitting signal generator to produce a series of light emissions having a different visually detectable character for each of said modes of operation.

18. A combined audible and visual signaling device according to claim 17, wherein said apparatus comprises a microprocessor programmed to energize said generators sequentially for each of said modes of operation with said audible signal generator being energized between two successive occurrences of said series of light emissions from said light emitting signal generator.

19. A combined audible and visual signaling device according to claim 1, wherein said apparatus is constructed to energize said strobe light to flash at a different visually detectable rate for each of said modes of operation.

20. A combined audible and visual signaling device according to claim 19, wherein said apparatus is constructed to energize said strobe light to emit a plurality of flashes in at least two separate bursts where the bursts are spaced by a time interval in excess of the time between flashes within a burst.

21. A combined audible and visual signaling device according to claim 20, wherein said apparatus comprises a microprocessor programmed to energize said generators sequentially for each of said modes of operation with said audible signal generator being energized during the interval between bursts of flashes from said light emitting signal generator.

22. A combined audible and visual signaling device according to claim 19, wherein said apparatus and said generators are disposed in a common housing and provided with the blade and pin elements of a three prong plug projecting from a rear wall of said housing arranged to be plugged directly into an electric wall outlet, and means within said housing for coupling said plug elements to said apparatus and said generators for supplying operating power thereto.

23. A combined audible and visual signaling device according to claim 22, wherein said apparatus is constructed to energize said strobe light to emit a plurality of flashes in at least two separate bursts where the bursts are spaced by a time interval in excess of the time between flashes within a burst.

24. A combined audible and visual signaling device according to claim 23, wherein said apparatus comprises a microprocessor programmed to energize said generators sequentially for each of said modes of operation with said audible signal generator being energized during the interval between bursts of flashes from said light emitting signal generator.

* * * * *